US012639601B2

(12) United States Patent
Stolarz et al.

(10) Patent No.: US 12,639,601 B2
(45) Date of Patent: *May 26, 2026

(54) MULTIPLE CHOICE DECISION ENGINE FOR AN ELECTRONIC PERSONAL ASSISTANT

(71) Applicant: TELEPATHY LABS, INC., Tampa, FL (US)

(72) Inventors: Damien Stolarz, Los Angeles, CA (US); David Joseph Diaz, Valley Village, CA (US); James Rossfeld, Torrance, CA (US); Scott Raven, Modesto, CA (US); Christopher O'Malley, Los Angeles, CA (US); Christopher Kurpinski, Washington, DC (US)

(73) Assignee: Telepathy Labs, Inc., Tampa, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/940,707

(22) Filed: Nov. 7, 2024

(65) Prior Publication Data

US 2025/0068949 A1 Feb. 27, 2025

Related U.S. Application Data

(63) Continuation of application No. 18/350,028, filed on Jul. 11, 2023, now Pat. No. 12,159,243, which is a
(Continued)

(51) Int. Cl.
*G06F 3/041* (2006.01)
*G06F 3/01* (2006.01)
(Continued)

(52) U.S. Cl.
CPC ................. *G06N 7/01* (2023.01); *G06F 3/01* (2013.01); *G06F 3/012* (2013.01); *G06F 3/0482* (2013.01);
(Continued)

(58) Field of Classification Search
CPC ................. G06F 16/242; G06F 16/245; G06F 2203/011; G06F 3/01; G06F 3/012;
(Continued)

(56) References Cited

U.S. PATENT DOCUMENTS

2006/0235684 A1* 10/2006 Chang ..................... G10L 15/30
704/E15.047
2009/0234755 A1* 9/2009 Sidoruk ............. G06Q 30/0603
705/26.1
2010/0054518 A1* 3/2010 Goldin .................. H04M 1/724
381/370

* cited by examiner

*Primary Examiner* — Insa Sadio
(74) *Attorney, Agent, or Firm* — Michael T. Abramson; Jordan IP Law, LLC

(57) ABSTRACT

To simplify assisting a user in their day-to-day activities, a communication for performing an action may be sent to a user in the form of a query, where the query includes the most likely set of choices for the action arranged in a group of dichotomous (e.g., yes/no) or multiple choice answers. In this manner, a user may respond to the query by simply selecting one of the dichotomous or multiple choice answers. Historical logs of past actions, responses, queries, and so forth, may be used to predict future user actions or needs, and to formulate future queries for sending to the user. These techniques may be implemented, for example, through a remote coordination server or directly through a user's personal electronics device.

20 Claims, 5 Drawing Sheets

Related U.S. Application Data continuation of application No. 17/875,783, filed on Jul. 28, 2022, now Pat. No. 11,741,385, which is a continuation of application No. 15/881,074, filed on Jan. 26, 2018, now Pat. No. 11,436,511, which is a continuation of application No. 15/229,902, filed on Aug. 5, 2016, now Pat. No. 9,904,892, which is a continuation of application No. 13/358,004, filed on Jan. 25, 2012, now Pat. No. 9,842,299.

(60) Provisional application No. 61/435,985, filed on Jan. 25, 2011.

(51) Int. Cl.

| | |
|---|---|
| *G06F 3/0482* | (2013.01) |
| *G06F 3/14* | (2006.01) |
| *G06F 16/242* | (2019.01) |
| *G06F 16/245* | (2019.01) |
| *G06N 5/04* | (2023.01) |
| *G06N 7/01* | (2023.01) |

(52) U.S. Cl.
CPC .............. *G06F 3/14* (2013.01); *G06F 16/242* (2019.01); *G06F 16/245* (2019.01); *G06N 5/04* (2013.01); *G06F 2203/011* (2013.01)

(58) Field of Classification Search
CPC ........... G06F 3/0482; G06F 3/14; G06N 5/04; G06N 7/01
See application file for complete search history.

MULTIPLE CHOICE DECISION ENGINE FOR AN ELECTRONIC PERSONAL ASSISTANT

CROSS-REFERENCE TO RELATED APPLICATIONS

This application is a continuation of U.S. patent application Ser. No. 18/350,028 filed on Jul. 11, 2023, which is a continuation of U.S. patent application Ser. No. 17/875,783 filed on Jul. 28, 2022, now U.S. Pat. No. 11,741,385, which is a continuation of U.S. patent application Ser. No. 15/881,074 filed Jan. 26, 2018, now U.S. Pat. No. 11,436,511, which is a continuation of Ser. No. 15/229,902 filed on Aug. 5, 2016, now U.S. Pat. No. 9,904,892, which is a continuation of U.S. patent application Ser. No. 13/358,004 filed on Jan. 25, 2012, now U.S. Pat. No. 9,842,299, which claims the benefit of U.S. Provisional Application No. 61/435,985 filed on Jan. 25, 2011, which applications are hereby incorporated by reference in their entireties.

FIELD OF THE INVENTION

The present invention is in the field of artificial intelligence. More specifically, the present invention is in the field of electronic personal assistants using adaptive intelligence to evaluate likely actions and decisions relevant to the user for the purpose of assisting the user to organize his or her day-to-day activities.

BACKGROUND OF THE INVENTION

People generally have a need for organizational tools to manage their busy lives. Such tools have, in the past, consisted of clumsy paper-based systems, and more recently have begun to make use of computer technology. Today, portable personal assistant devices, such as smartphones and personal digital assistants (PDAs), exist to help people keep track of information, scheduling, appointments, reminders, contact information and myriad other bits of data. Such devices can present prescheduled alerts and reminders to the user. Many of the latest devices can synchronize their data with remote servers, and receive messages and instructions from remote sources. However, these devices generally do not have any sort of built-in intelligence. They are unable to adapt to the behavior, environment or needs of the user. The user has to explicitly instruct the device to perform any specific action. This limits the usefulness of such devices as personal assistants, as the user must constantly monitor the function of the device to ensure it has all the correct data and has been programmed to perform the correct actions at the correct times.

It should be noted that Patent 61/445,433 includes concepts related to the invention described herein.

Hands-free computing devices, such as Bluetooth headsets, exist that allow the user to interact with a computer or mobile device, giving commands and receiving information. Rudimentary neural interfaces even exist that can detect commands and responses indicated by the user's thoughts and emotions. However, none of these hands-free devices is capable of connecting directly and immediately to a more distributed source of processing power, such as a "cloud" of networked devices available for computing, and none is capable of adapting its behavior to the user's current circumstances—environment, status, activity, etc.—or predicting the user's desires and proactively consulting the user regarding potentially desirable actions and information.

In using a neural interface, the user thinks a particular thought or expresses a particular emotion to register a particular input, such as "yes" or "no." An example of such a device is the NeuroSky MindSet. These neural devices, however, can be difficult to learn to use, they require a great deal of concentration to ensure the correct thought is brought to mind or the correct emotion expressed, and they are quite slow in terms of how quickly the user can register an input. The level of concentration necessary precludes use of a neural interface while performing other tasks requiring concentration, such as driving a car, holding a conversation or operating machinery. Further, the difficulty of registering an unambiguous stimulus to the interface makes these devices useful only for the simplest and least critical applications. These are severe limitations that prevent many potential uses for neural control devices.

Transcription services exist whereby a user can call a specific telephone number, speak a message and have the message sent to any of a number of destinations, including an email address, a blog and the microblogging service Twitter. The limitation of these services, however, is that the user must call a number and wait for a connection before speaking his or her message, which consumes a great deal of extra time and requires extra focused attention.

Predictive dialers exist that automatically call telephone numbers, play a recorded message, wait for a response from the recipient of the phone call, whether via keypad entry on the telephone or via interactive voice response (IVR), and then play another recorded message or transfer the recipient to a particular telephone number based on the response. But these dialers are fixed in their functionality, cannot ask questions autonomously and cannot automatically adapt to the user's preferences and behavior.

Limited data prioritization systems exist, such as Gmail's Priority inbox, that adaptively sort information based on relevance or importance. However, these systems are generally limited to specific domains and do not operate broadly enough to be useful in a true personal assistant system.

Numerous services exist that present recommendations (such as product recommendations) based on historical and "crowd-sourced" data—data gathered from the behavior of large groups of users—such as Hunch.com, Mint.com and Amazon.com. However, none of these services is sophisticated enough to support a true personal assistant system.

Systems have been previously described that estimate a user's current "state" in terms of activity and availability, but none of these systems use the resulting conclusions to provide the adaptive interaction and decision-making capabilities of a true personal assistant. Further, some systems make possible semi-automated scheduling using some level of automatic decision-making capability, but these systems are limited in scope and fall short of the qualities desirable in a true electronic personal assistant. Other systems exist that make use of distributed data sources and the user's current context to provide relevant information, but these too fall short of a true personal assistant in that they simply provide information and do not provide the decision-making capabilities desired of a personal assistant.

Live, remote personal assistant services exist that provide the functions of a personal assistant to many customers for a fee, and operate via phone, email or other communication channels. However, these services are just a different way of providing traditional personal assistant services, and still require that a live individual perform the services. The automation of services is not present, as is desirable in a true electronic personal assistant system. Further, as the customer usually does not know the hired assistant personally, lack of trust and close communication can present obstacles to effective service.

When being called on to make decisions, executives usually prefer simple, clear proposals, providing all relevant data and requiring approval or disapproval (or possibly deferral).

This reduces the burden on the executive and increases efficiency. However, existing digital assistant devices fail to meet this need, requiring a human operator to find, evaluate and analyze information. Thus, the executive either has to do the work himself or hire a live assistant to manage his digital assistant, effectively defeating the purpose.

The present invention has the object of solving these problems.

SUMMARY OF THE INVENTION

It is an object of the present invention to provide an electronic personal assistant device that assists the user in recalling information and provides the user with timely reminders and alerts.

It is another object of this invention to query and/or infer the user's behavior patterns, on a one-time or ongoing basis, so as to be able to predict desired or necessary actions and present them to the user for approval.

It is another object of this invention to record the user's behavior and observe the user's current location and circumstances, and use the resulting data to adapt its operation to best suit the user's needs, predicting as reliably as possible which data the user will need at any given time and presenting it to the user.

It is another object of this invention to ask the user dichotomous or multiple-choice questions—i.e., requiring yes/no or other dichotomous answers, or questions with a larger number of choices—to determine whether predictions made as to the user's needs are correct, and adapt future behavior based on the responses to such questions.

It is another object of this invention to reduce decisions to simple, direct queries that can be presented to the user, briefly and with all relevant data, for decision, such that the user is asked to make a simple choice between two or more options.

It is another object of this invention to allow remote storage and processing of the user's data, including execution of the adaptation and prediction algorithms used.

It is another object of this invention to allow the remote storage and processing unit to initiate dichotomous queries of the user by communication via the user's electronic personal assistant device, and receive the responses to said queries from the device for storage and processing, via a phone call, computer network communication or other method.

It is another object of this invention to allow the user to deliver commands to an electronic personal assistant device, via speech or another means, for execution, either directly on the device or via the remote storage and processing unit.

It is another object of this invention to provide the user with a voice-driven interface allowing control and communication solely via speech, but also to provide a physical interface for control and communication with the system.

It is another object of this invention to detect, either by direct user command or by recognition of unique environmental circumstances, the "state" of the user—i.e., whether the user is busy and shouldn't be interrupted, needs only urgent alerts and reminders, should be freely communicated with, etc.

It is another object of this invention to provide a neural interface, using the brain's emitted waves, neurally induced energy effects, muscular impulses or physical movements to detect dichotomous (e.g., yes/no) or simple multiple-choice answers to questions.

It is another object of this invention to make possible various different types of user interfaces, including, but not limited to, neural, emotional and physical interfaces.

It is another object of this invention to provide a low-latency user interface that responds promptly even when using a remote unit for storage and processing, and that is "always on" and will react quickly to voice or other commands without any sort of initialization or wakeup command.

It is another object of this invention to provide a low-latency user interface that responds reliably, and will either deliver the user request or promptly inform the user that the task will be delayed until the necessary resources (such as network connectivity or a functional smartphone) are available.

It is another object of this invention to provide an active task management and reminder system to assist the user in accomplishing desired tasks in specified time frames.

It is another object of this invention to provide a personal contact service wherein a meeting with one or more other parties can be scheduled and initiated without direct action by the user, via any available communication channel.

It is another object of this invention to allow integration with live personal assistant services and to provide an abstraction layer for such services.

DETAILED DESCRIPTION OF THE INVENTION

Illustrative embodiments and exemplary applications will now be described to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications and embodiments within the scope thereof, and additional fields in which the present invention would be of significant utility.

Some portions of the detailed descriptions that follow are presented in terms of algorithms and symbolic representations of operations on data within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proved convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining," "selecting," "displaying," "sending," "receiving," "updating," "modifying," "assigning," "requesting," "notifying," "communicating," "interfacing," "encrypting," "decrypting" or the like refer to the actions and processes of a computer or similar electronic device having processing circuitry and components that manipulate and transform data represented as physical (electronic) quantities within the system's registers and memories into other data similarly represented as physical quantities within the computer's memories, registers or other such information storage, transmission or display devices.

Figure 1:
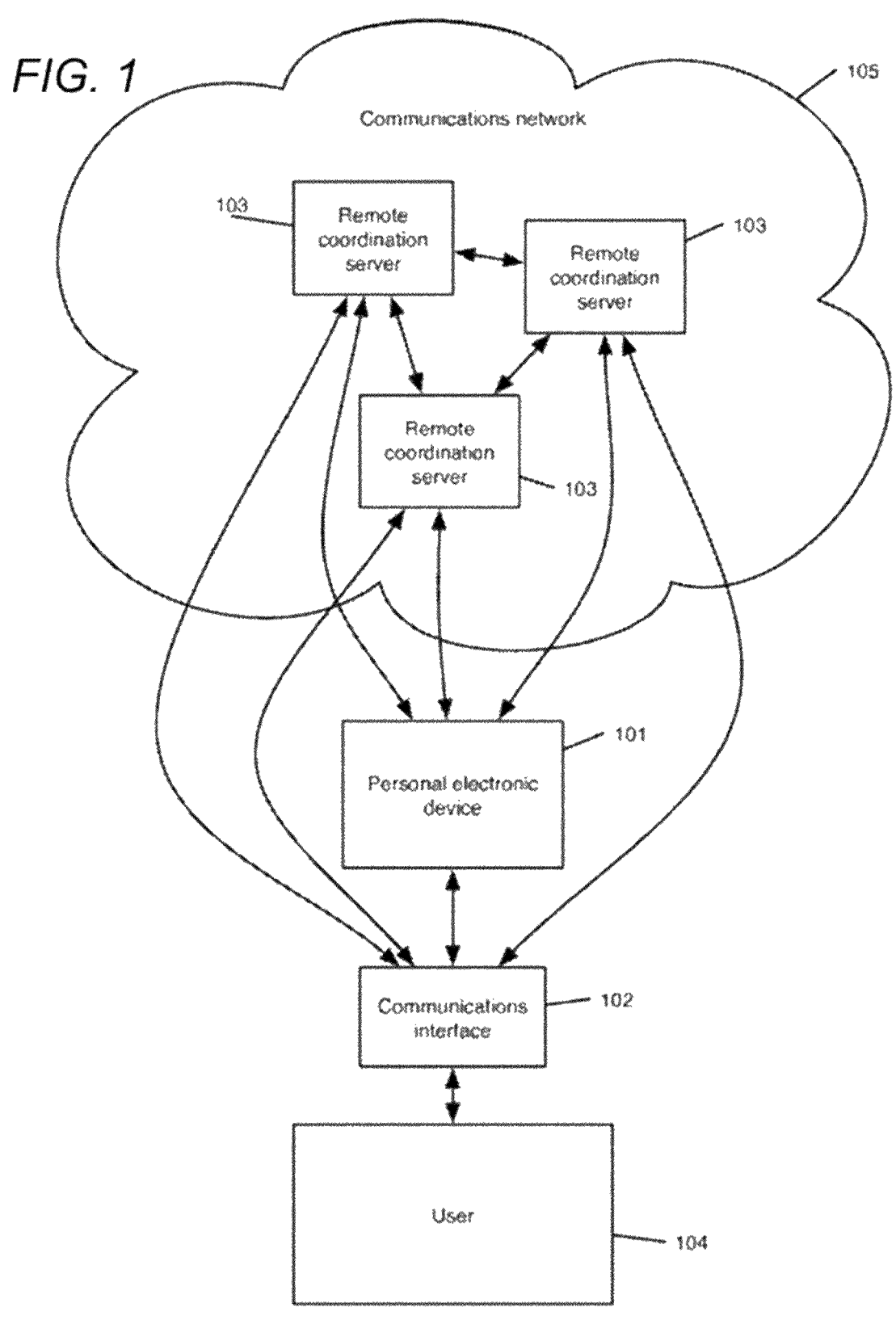
FIG. 1 is a diagram of the components and interconnection of one embodiment of the personal assistant system described herein.

As generally shown in FIG. 1, a preferred embodiment consists of a personal electronic device 10 I, such as a smartphone or PDA; a communications interface 102, such as a Bluetooth headset or neural interface; and one or more remote coordination servers 103. The communications interface 102 serves as the user's primary means of interaction with the system, allowing the user 104 to issue commands, receive data and respond to queries from the system. The personal electronic device 101 serves as a communication link to the remote coordination server(s) 103 and other services, such as telephony and Internet services, but can also be used as a secondary means of user interaction with the system. The remote coordination server(s) 103 perform the bulk of the system's processing tasks and serve as the central management point for the user's data, although some of these functions can be performed by the personal electronic device as its capabilities permit. The personal electronic device 101 and the communications interface 102 are connected to the remote coordination server(s) 103 via a communications network 105, such as a computer or telephony network.

In one embodiment of the present invention, the communications interface is a headset, such as a Bluetooth headset commonly used with mobile phones, and the user interacts with the system using voice commands and responses. The headset is linked to the personal electronic device, in this case a smartphone. The smartphone in turn connects to a telephony network, the Internet and other such services, and uses telephony and a standard TCP/IP network connection to communicate to a set of remote coordination servers with a standardized communication interface.

Figures 2, 3:
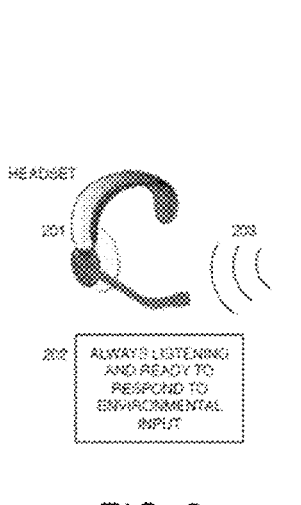
FIG. 2 is a diagram showing the "always on" aspect of a communications interface device as used in some embodiments.
FIG. 3 is a flow chart for the implementation of the "always on" aspect of the system according to one embodiment.

The user can issue a vocal command to the headset, which detects the command and forwards it to a software control program running on the smartphone, headset or other device. A key feature of this embodiment is that there is no need for the user to press a button or speak a command to "wake up" the system and prepare it to receive commands. The headset is always listening for user commands and detects when the user has spoken an intelligible command that can be executed. This is illustrated in the embodiment shown in FIG. 2: a headset 201 is always listening 202 for audio input 203 and processing any commands it detects. However, in some embodiments it is possible to signal the beginning of a verbal command by pressing a button on the headset or other communications interface. In one embodiment, as shown in FIG. 3, the headset idles in a low-power mode 301 waiting for a sudden increase in volume 302, and then records and processes the subsequent sounds, looking for a parseable command 303. If it finds such a command 304, it passes it to the software control program running on the smartphone 305. This can be done in several ways. In one implementation, the entire recording of the user command is passed to the control program (buffered mode). In another implementation, the moment a command is detected, the audio information is streamed to the control program in a way similar to "cut through" routing, as is known in the art. In another implementation, the audio is always being streamed to the control program, either continuously or whenever an audio threshold is exceeded. If the smartphone is not immediately available for some reason—e.g., its power is off or it is disconnected from the headset, the headset stores the received command in a buffer, waiting for the smartphone to become available again, at which point it proceeds to send all buffered commands to the software control program running on the smartphone. In another embodiment, the headset itself is doing the command parsing using a control program. Some examples of commands the user could deliver to the system are to initiate a phone call; pick up a phone call; hang up a call; send a predefined message via email, text message, etc.; pay a bill using a specified bank account; purchase a specified item; post a status update to a social networking Web site; order a meal for pick-up from a restaurant.

The smartphone, upon receiving a command, either executes the command itself or forwards it to one of the remote coordination servers for execution. Some commands have no need for remote execution, such as a request to initiate a phone call, and these are executed by the smartphone itself. Other commands, such as a request for a Web search, data from a Web site or information based on the user's current geographical location, requires a connection to a remote service, and would thus be routed to one of the remote coordination servers for handling.

The remote coordination server then processes the request and returns a response indicating success or providing the requested data. Upon receipt of this response, the smartphone displays a suitable message for the user and additionally forwards the response to the headset, which informs the user vocally of the result if appropriate.

In a similar fashion, a remote coordination server can originate communication to the user. Based on its internal algorithms, the remote communication server may deem it necessary to provide the user with information or present the user with a query, in which case it sends a message to the user via any available communication medium. It may place a phone call to the user and vocally deliver the communication, or it may transmit the communication via the Internet to the user's smartphone, which in turn delivers the message to the user vocally or on its screen.

The user can configure the system to deliver notifications when specific events occur, and the system will monitor the user's data sources to establish when such events have occurred and deliver a notification via any available communication channel (or as limited by the user's indicated preferences) to the user. For example, the system can notify the user when a particular person is in a particular location; when any of the user's friends or family are nearby; when a particular person changes location; when a particular person becomes available online, as on an instant messaging service; when the status of a house alarm changes; when the status of a remote computer server changes (e.g., the server stops responding); when a communication is received, such as a voicemail, text or email message; when the price of a security changes sufficiently; when particular events occur in an economic market; when a particular business condition is present; when some event on an associate's calendar is changed; when an event is scheduled or changed on a user's own calendar; when an event occurs nearby that is relevant to the user; when traffic conditions change in the user's path; when an airline flight changes its schedule. These notifications, of course, require that the system have access to the relevant data, but the system, having access to all the user's data stores and sources, as well as worldwide network access, has access to an immense amount of information. The available information is analyzed based on the user's request for notification and based on behavioral information about the user, as in the case of the general relevance of an event to the user.

In some embodiments of the present invention, the user can answer queries via a standard neural interface, as is known in the art. The user simply dons the appropriate apparatus and thinks or emotes the desired response to questions posed by the system, the answers being detected by the neural interface and passed to the user's personal electronic device for handling.

In various embodiments of the system, different user interface devices can be used, in place of or in addition to the headset specified for the preferred embodiment. Such interfaces can include, but are not limited to, neural interfaces, face-tracking systems, eye-tracking systems, gestural devices, bodily sensors, interactive voice response systems and voice control devices. The user can register input via any of a number of possible methods, including, but not limited to, voice or other sounds; pressing buttons on a keypad, as on a phone; thinking a particular thought; expressing a particular emotion; tensing a muscle; typing on a virtual keyboard; blinking; moving the eyes; making a particular face; smiling and! or frowning; winking; sighing; whispering; making a specific motion; raising a number of fingers; shaking or nodding the head; and exercising a "phantom limb," wherein the user activates a little-used muscle or nerve; muscular stimuli; or electronic signals induced in the nerves, brain and surface of the head or body by thoughts or emotions felt by the user. Output to the user can employ any of a number of methods as well, including, but not limited to, display of data on a screen or other visual output device; audio cues, whether vocal or not; vibration; neural stimuli; music; or electronic waves applied to the body, head or brain that induce thoughts or emotions in the user.

Figure 4:
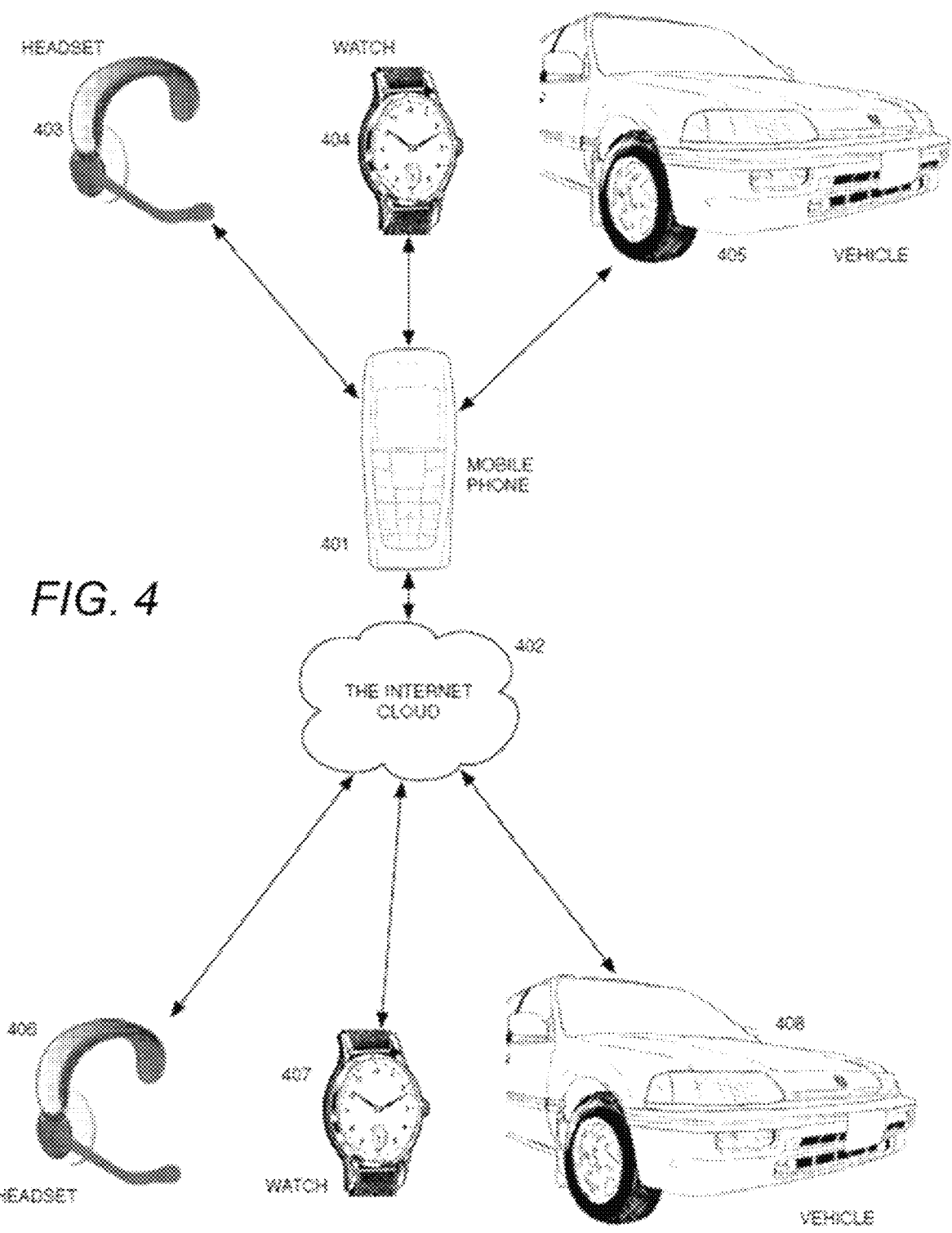
FIG. 4 is a diagram showing the connectivity of the system to the user's various data stores.

FIG. 4 shows a few of the possible system configurations. Note that these are merely examples and by no means encompass all possible system configurations. As shown in FIG. 4, the user interface device could be a headset 403/406, a wristwatch 404/407 or a vehicle 405/408. The user interface could then connect directly to remote coordination servers via the Internet 402, or could connect via a mobile phone 401 to the remote coordination servers.

Figure 5:
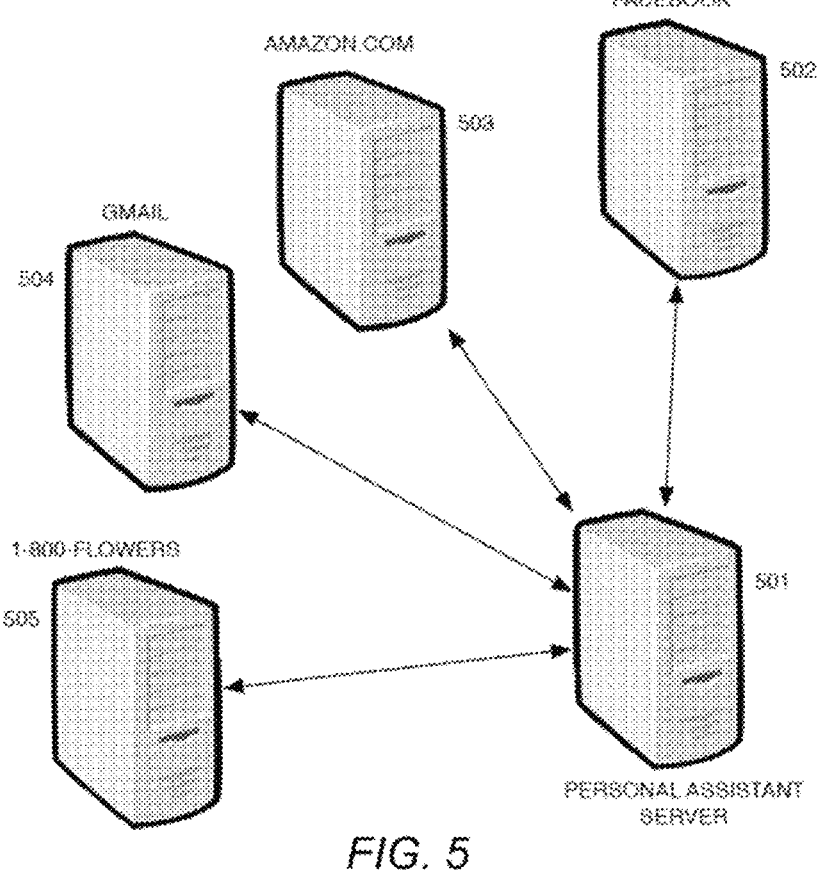
FIG. 5 is a diagram showing examples of possible system configurations.

In a preferred embodiment, the system has access to any available data stores belonging to the user. Namely, the system can draw upon any of the user's data stored in the "cloud," such as Web-based email, contact databases, data stored on social networking Web sites, online retail transactions, news feeds, etc. This is illustrated in the example shown in FIG. 5, wherein the personal assistant server 501 has access to (and thus can retrieve data from and send data to) Facebook 502, Amazon.com 503, Gmail 504 and 1-800-FLOWERS 505. The system and user interface provide the user with immediate access to all available data stores by simple command, and suggest relevant data as described below.

In a preferred embodiment of the present invention, the remote coordination servers implement a degree of intelligence by adapting to the user's behavior, location and circumstances, and attempting to predict the user's needs. The remote coordination servers have access to the user's present location via the facilities of the user's personal electronic device (e.g., a smartphone), and use this location in conjunction with the time and other current data about the user to determine what data might be relevant to the user, such as information about nearby businesses, proximity of associates or friends, tasks the user needs to perform near the current location, etc. In addition, the remote coordination server maintains an historical log of the user's actions in using the system for the purpose of discerning patterns and predicting potential future user actions or needs. Further, the system can use an aggregate historical log of all its users to establish correlations between users for the purpose of predicting user needs and desires: when a correlation is found for a given user, the actions and needs of correlated users can be used to suggest actions and present data to that user. This can be implemented using a statistical "crowdsourcing" approach as known in the art. When the remote coordination server has predicted that the user might need or want to perform a particular action or view a particular bit of information, it presents this to the user. If the user needs to make a decision about a particular action, the system presents a yes/no dichotomous (or multiple-choice) query to the user and then performs or does not perform the action depending on the user's response. If the system presents the user with an unsolicited bit of information, it might ask the user whether the information was useful or not, or the user might originate volunteered feedback on such, which the system will note for future. The remote coordination then records the result of any such query in its historical log for future analysis. This intelligent functionality is in addition to the usual functions of an electronic personal assistant device—namely scheduling events, alerts and reminders, and requesting specific bits of information for display to the user. Augmenting these basic organizational functions, the system can keep track of any tasks the user needs to perform and continue to remind the user of such tasks until the user reports their completion or cancellation.

In some embodiments, the queries are not limited to dichotomous answers, but might allow multiple-choice answers as well, giving the user a number of options to choose from. For example, instead of simply asking for a yes/no answer, the system might allow a third option, such as "ask me later," in which the user puts off a decision on the matter. A specific example of this usage would be a reminder of the user's mother's birthday: the system would remind the user of the birthday and then offer a set of options, such as (a) send flowers, (b) send candy, (c) send a gift card with a note or (d) do nothing (in which case the user might handle the gift herself).

Note that in embodiments where more complex input devices are available, such as computer keyboards, the user's input to the system is not limited to dichotomous or multiple-choice answers, as described below, but can include specific commands, allowing more precise control of system behavior and control of aspects of the system that are difficult or impossible to control using a simple multiple-choice system.

A key portion of the intelligence of the system lies in determining what decisions the user might make for a given situation. Rather than simply asking the user what to do, the system analyzes its database for the user and all the user's data sources to determine the most likely set of choices the user might make, thus "boiling down" or reducing the decision to a simple set of dichotomous or multiple-choice questions. Further, for more complex decisions, the system would present the user with a hierarchy of queries, presented as a series, each query narrowing down the final decision toward an exact action. For example, the system might remind the user of a friend's birthday, then ask if he wants to purchase a gift for the friend from the friend's Amazon-.com wish list. If the user answers yes, the system would retrieve an item from the wish list and, perhaps after a delay, ask the user if he wants to purchase that specific item. If the user answers yes, the system might ask if the user wants to gift-wrap the item, and then whether the user wants to include a message. If the user wants to include a message, the system might transcribe it from dictation by the user, or might choose a message typically sent by the user on such occasions and present it to the user for approval. Finally, the system would purchase the gift and have it sent to the friend as specified by the user.

A similar technique can be used for advertising. In some embodiments, if the user so chooses, the system can recommend products based on the user's current circumstances, activities and known data about the user. For example, if the user is known to be shopping for a gift for his wife in a particular location, the system might recommend a specific item his wife has indicated that she wants, and indicate a nearby store where it can be purchased. Such as system can further include provisions to protect the user's privacy by performing all calculations within the system and sending none of the user's personal data to outside parties, such as marketers or other companies.

In some embodiments, the system initially requests that the user answer an extensive survey as to various personal and behavioral preferences. The questions of the survey are intended to define key constraints for the system to ensure its decisions match the user's usual decisions and behavior as much as possible. Such a survey can include, but is not limited to, questions such as: What do you give as gifts? How many people's birthdays do you celebrate? Do you celebrate birthdays? How do you remember people? How do you like to stay in contact with people? Do you write short or long letters? Do you stay in touch with (a) everybody, (b) close friends, (c) relatives? What type of work do you do? What is your work style? What faith do you hold? What package of customs do you follow? These and other questions give the system an initial base of behavioral information that will be expanded upon by analyzing the user's various data stores and sources, and by analyzing the user's behavior on an historical and ongoing basis. The system further analyzes the user's past communications, such as via email, text message, etc., to establish the user's communication style, interests, activities, relationships, personal and business networks, and other factors, semantically parsing the communications as is known in the art. The system differentiates between different types of communication (e.g., personal, work, etc.) to establish different categories of behavior, relationships and preferences. From this analysis and from ongoing analysis of the user's data and activities, the system infers other factors, including, but not limited to, who the user's friends, family and associates are; how the user prefers to communicate (via email, phone, text message, letter, in person, etc.); where the user works; the user's work style; where the user lives; what the user prefers to do for leisure; where the user likes to vacation; what types of products the user likes to purchase for himself and others: the user's religion and degree of religiousness; and the user's sexual preferences.

Additional "plugin modules" of survey information can be integrated to further customize the system to the user. For instance, a number of modules may be implemented that connect the system to external data sources, such as LinkedIn™ or Facebook™, email systems, search engines with browsing history, and numerous other systems as known in the art. By providing a conduit between the rich contextual data about the user provided by these systems, the present system of this invention can infer additional patterns of activity and behavior and intent from the user. Interfacing with such systems through a Web-based API is well known in the art.

Additional modules within the system can be developed. For instance, an improved gift-shopping module could be implemented using an API provided by the present invention. This API allows applications to be inserted into and run within the invention, or to run externally to the system and access data from within the system, depending on the privacy level being enforced. This improved gift-giving module would aggregate all the most frequently communicated—with people in the user's life, determine who the user has given gifts to before, aggregate as many birthdays and holiday preferences from the cultural notes about the respective users (e.g., Christmas vs. Hannukah), and determine any other appropriate holidays from address book entries or CRM systems (children's birthdays, etc.). The module would then provide a Web-, mobile-app, voice-response-, or application-based interview to the user and determine what kind of gifts the user wants to be asked about, how many, who, relevant price ranges, etc. The module would then subsequently, in coordination with the present invention, ask the user to approve or disapprove matching offers. This module could be tied in with a specific cohort of cooperating online retailers or a gifting service. Advantageously, the system could be almost completely automated, but at the point of choosing a gift, the model could be designed to reduce the gift choice to a human-executable task, using an approach of Amazon.com's "mechanical turk" system, where the context of the recipient, sender, sending history, price range and a set of options are provided anonymously to a human gift-chooser. Or, the module could interface to a gift service that has been granted non-anonymous access to the user's gifting patterns, where a human looks at the context and the overall gifting budget of the user, and designates which gifts should be given for a set recipients. These choices, whether implemented in the anonymous or non-anonymous approach, are then presented to the user for approval in accordance with the invention.

Although this approach is herein detailed for the specific case of gift-giving, modules of this type can be developed by third parties or by the implementers of the invention, and can be implemented in a completely computer-automated way, using artificial intelligence and statistical matching techniques, as known in the art, to provide predicted solutions to user needs, or can be used to provide candidate answers and solutions to service-providing humans via a Web or voice interface (as in scheduling/coordination applications), who then use their intelligence to solve the critical portion of the solution proposal. In this way, the system and any integrated or third-party modules can provide personal assistance in a highly scalable way, because a given expert personal assistant can have his or her decision-making ability scaled across hundreds of users needing assistance over the same time period. Or, conversely, the personal assistance needed for a given user can be farmed out scalably to humans located in disparate locations, providing culturally and contextually relevant solution proposals for the user for a small transactional cost as opposed to an hourly or salary rate.

Figure 6:
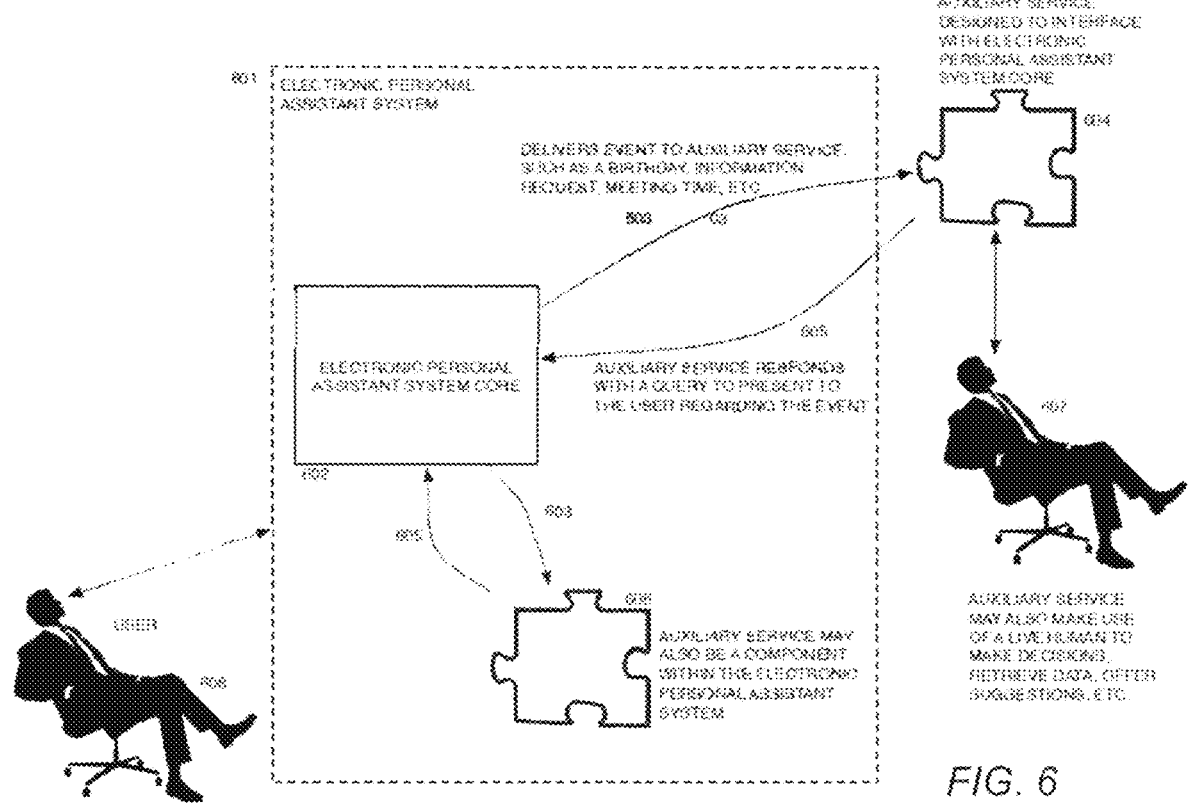
FIG. 6 is a diagram depicting the use of auxiliary "plugin" modules to expand the functionality of the system.

FIG. 6 depicts a possible embodiment of this "plugin module" architecture. The core processing module 602 of the electronic personal assistant system 60 I makes available an interface that can be used by auxiliary services. The core delivers events (e.g., birthdays, information requests, meeting times) 603 to the auxiliary service 604, which is designed to interface with the core. The auxiliary service then responds with a query or some information 605 to present to the user 608. The auxiliary service can either be an external component provided by a third party 604 or an internal component built into the electronic personal assistant system 606 (for instance, in customized versions). Further, the auxiliary service can make use of human interaction to satisfy its functionality 607.

An additional aspect of this intelligent functionality is that the system can adapt its level of "presence" or intrusiveness to suit the needs and desires of the user. For instance, the user can command the system to stop presenting queries, reminders, etc., or reduce its message delivery to urgent communication only. In addition, the system can detect, based on its historical logs of user activity and its sensory inputs (location sensors, noise sensors, device state, GPS or latitude/longitude location detected from a mobile device, nearby wireless transmitters, etc.), when the user is in a location or set of circumstances requiring less intrusiveness, such as in a business meeting or a movie theater, and adjust its level of intrusiveness appropriately. This adaptation can take into account the user's usual schedule, as recorded in the historical logs, and adjust its behavior accordingly. Further still, the system can query the user as to the desirability of a particular communication when it is unsure probabilistically of the current needs of the user as to its level of intrusiveness, and store the user's response in its historical logs for use in making future predictions about the user's needs.

In some embodiments, the system initially surveys the user as to his usual schedule and when he is willing to be interrupted for queries. Such a survey can include, but is not limited to, questions such as: Do you want to be interrupted (a) in the shower, (b) on the drive to work, (c) when you are sleeping, (d) when your phone is in silent mode, (e) during meetings? For whom do you want to be interrupted? For what sorts of situations do you want to be interrupted? When do you not want to be interrupted? What are your daily and weekly schedules? Is there a specific time each day when you would like to be presented with decisions for the day? Further, the survey can allow the user to specify degrees of "interpretability"—that is, during certain times or given certain circumstances, the user can specify his preferences on a scale from "should be interrupted" to "absolutely must not be interrupted." This can include such designations as "should be interrupted only for important matters" and "ask discreetly whether I should be interrupted."

When the system has a query or information to present to the user, it first queries the user as to whether he is willing to be interrupted, unless it is already known that the user is willing to be interrupted (such as at defined times or immediately after another query) or is unwilling to be interrupted. To contact the user, the system uses all available communication channels specified by the user for contact, such as directly via the system's primary interface device, via phone, via email, via text message, via instant message, etc. To preserve privacy, if the system does not have a direct line to the user, as via the system's primary interface device, it only presents the user with a notification that it is attempting to contact him and does not include any of the content of the communication. When the user then responds or requests the remainder of the communication, it is provided via the desired channel. Further, in some embodiments, when the system requests an interruption, in addition to allowing or disallowing the interruption, the user can respond to the request with indication that he is only to be interrupted if the request is quick, and the system will adjudicate the complexity of the communication and withhold it if it includes more than a specified amount of information or number of queries. Thus an interruption is divided into two actions: (1) determining whether the user is willing to be interrupted or notifying the user that information or a query is available, and (2) presenting the query or information.

As it may occur that the user is unreachable at certain times or under certain circumstances, or simply does not want to answer questions posed by the system, the system can "save up" messages and unanswered questions and present them to the user when he or she is next available, or when he or she indicates readiness to receive the backlogged messages and questions. In addition, the system can predict the user's availability and willingness to receive messages and answer questions based on the historical logs of user activity, and adjust its presentation of information and posing of questions appropriately. Further, the user can define times he wishes to devote to answering queries from the system, such as a particular time every day, and the system can majorly present non-urgent queries and other information to the user at the specified time(s).

One use of the present invention is as a planning aid. In some embodiments, the system keeps track of the tasks the user needs or wants to complete, and when, and helps the user to complete them by making any decisions it can for the user, and by presenting reminders and queries to the user at appropriate times. For example, the system might remind the user to take vitamins daily, walk the dog in the morning, get an oil change every 3,000 miles of driving or check the status of a network server on an hourly basis. The system, having access to all the user's data stores, integrates closely with all of the user's calendars and planning tools, and conforms to any specific planning methodologies used by the user. For instance, the system can integrate with such tools as Microsoft Outlook, Google Calendar, Franklin Planner software and other such planning tools, and conforms to such planning methodologies as Getting Things Done and the Franklin Covey planning methods, among others, as desired by the user. Further, the system includes its own planning interface to allow the user to schedule events and tasks to be recorded in any or all of the user's planning tools. In some embodiments, an initial survey of the user is done to establish common tasks and management methods, asking questions such as: What do you need to get done every day, and when? What do you need to be nagged about? What project management do you need? What micro management do you need? Which tasks are (a) important, (b) neutral, (c) unimportant, (d) only to be done in free time? Do you use a specific planning methodology? Do you need help getting to appointments on time? Do you like to be frequently reminded or told only once? Thus, the system gains an initial profile of the user's activities and schedules, and can combine this with data gathered from an analysis of the user's data stores. With a knowledge of all the users schedules and tasks, as well as the planning methodology the user prefers and specific preferences about reminders, the system can proceed to give the user the needed assistance in ensuring schedules are kept and tasks are carried out in a timely fashion. This is primarily accomplished by reminding the user of scheduled events and tasks, with a degree of insistence specified by the user on a general or task-by-task basis, but also includes the other functions of the system, such as recommending events and tasks for scheduling based on analysis of the user's data stores and sources, and partially performing individual tasks to the greatest degree possible, then presenting simple dichotomous or multiple-choice queries to the user for decision and acting on the decisions to the degree it is possible.

In some embodiments, the system provides the capability of scheduling and initiating meetings automatically. This proceeds roughly as follows: The user indicates that he wants a meeting with a particular person at a particular time or within a particular range of time. The system then autonomously attempts to contact the other person to schedule a meeting. It uses all available communication channels—phone, email, text message, instant message, etc.—to contact the other person and then attempts to negotiate a meeting time within the constraints defined by the user. This may involve repeated attempts to contact the other person, and the user can adjust the frequency and insistence the system uses in making such repeated attempts to avoid creating a nuisance. If the system cannot arrive at an agreement about meeting time, it establishes the other person's preferences as to schedule and presents them to the user, who then either chooses an acceptable time or gives a more preferable range of times. The system may also ask the other party for a schedule of availability on an ongoing basis for scheduling of future meetings, if it is determined that the person is someone the user is likely to meet with regularly. This process repeats until an agreement is reached (or aborts if no agreement can be arrived at). Both parties are notified of the final agreement, and the system updates the user's calendar and other planning tools to reflect it. Then, when the meeting time nears, the system asks the user if the meeting should proceed, and if so, reminds both parties of the meeting. At the time of the meeting, the system attempts to contact the other person via the preferred channel for the meeting (e.g., phone). Once the other person has been contacted and is on the line, the system contacts the user to join the meeting, if he has not joined already, and the meeting proceeds. The system uses a similar procedure for meetings involving three or more parties, but has to negotiate with more individuals to arrive at a meeting time.

Similarly, in some embodiments the system has the capability of attempting to contact others on behalf of the user. When the user indicates that he wishes to speak with a particular person, the system autonomously attempts to contact the person via any available communication channels, such as phone, email, etc. In some embodiments, the system can even keep track of the other person's behavior, availability and location over time, and use this historical data to predict possible locations and means of contact for the person. If the person does not respond and is not available (e.g., offline), the system watches the various available communication channels (e.g., instant messenger, VoIP, etc.) to determine when the other person might be available. If the user is also known to be available at that time, the system attempts to contact the other person and request a meeting. These attempts to make contact repeat at some frequency and level of aggressiveness specified by the user until the other party is either contacted or refuses the contact. Once contact is established, the system then contacts the user and connects the two parties.

In some embodiments, the system makes use of large stores of historical user data for large groups of users ("crowd-sourcing") to assist in decision-making Where a user's privacy preferences permit, the system records behavioral data for that user and combines it with the stored behavioral data of all such users to form a behavioral database. The system then analyzes this database to assist in decision-making, using standard techniques known in the art for the prediction of preferences and other choices.

In some embodiments, the user interface described can use a live personal assistant service to do the backend work, instead of or in addition to one or more remote coordination servers. In this case, the same control interface is presented to the user, but requests for action are routed as appropriate to the live personal assistant service for fulfillment. Reminders, information and requests from the live personal assistant service would be delivered to the user via the standard user interface, effectively hiding the existence of the live service and avoiding any qualms the user might have about using such a service due to concerns about security or other factors.

In some embodiments, the system provides a safety monitoring and notification service that keeps track of the user's location and expected path, and sends a warning if something unusual occurs (i.e., the user's path deviates outside some range of tolerance). For example, the user could specify a starting and ending time and location for a walk or other journey, and if the user failed to arrive in a timely fashion, the system might warn a family member or the appropriate authorities. The user could further specify the intended path, and a significant deviation from that path would trigger a warning.

As configurability is an aspect of the system, it may be necessary to provide a more complex interface to the user, such as via the Web or via a software application running on a personal computer or a smartphone. Such an interface would be used for the initial configuration of the system, as via a series of survey modules, and could then be used to make changes to configuration. In some embodiments, configuration would be possible directly via the dichotomous or multiple-choice interface itself, as a means of answering many complex questions about configuration.

A key aspect of the present invention is that it works around the limitations of many neural, emotional, physical and gesture-based input methods by reducing user interaction to the minimum necessary to arrive at a decision. As many such input methods tend to be clumsy, slow and require a great deal of concentration, all but the simplest of inputs are too difficult to register. Registering more than a few simple inputs is extremely difficult due to the necessity to differentiate among possible stimuli and the degree of processing necessary to do so. Current computing devices and algorithms are simply not up to the task. Thus, the present invention reduces user input to one or more dichotomous or multiple-choice queries that can be answered relatively easily using current mobile or hands-free input devices, with a minimum of concentration and a maximum of speed.

Further, the present invention provides real electronic personal assistant functionality, rather than a simple data store and interface device, as it is capable of making decisions on its own, observing situations relevant to the user and determining the mostly likely responses from the user, then presenting the decision to the user for approval. Thus, the present invention increases the user's efficiency and reduces the burden on the user by performing as much work as possible before requesting that the user make a decision.

Thus, a system, method and user interface have been described for providing a personal assistant functionality using a predictive, adaptive, dichotomous decision engine.

What is claimed is:

1. A computer-implemented method comprising:
receiving a communication from an electronic device;
analyzing the communication to determine a set of choices in response to the communication, where at least one choice from the set of choices has an associated task predicted for a user of the electronic device;
creating a query from the set of choices, the query including at least one question arranged in a structure to select among the set of choices, the structure corresponding to the at least one choice and the associated task;
sending the query to the electronic device for presentation to the user of the electronic device;
receiving, from the electronic device, an input in response to the at least one question;
based on the input, traversing the structure to reduce the set of choices to a selected choice;
based on the selected choice, where the selected choice is the at least one choice having the associated task, determining one or more actions to accomplish the associated task; and
performing the one or more actions to improve prediction and implementation of the at least one choice from the set of choices.

2. The computer-implemented method of claim 1, wherein the structure includes a root and one or more leaves, wherein the root and the one or more leaves are on a same level of the structure.

3. The computer-implemented method of claim 1, wherein the structure includes a root and one or more leaves, wherein the root is on a first level of the structure and the one or more leaves are on one or more second levels of the structure that are different than the first level.

4. The computer-implemented method of claim 1, wherein the analyzing the communication is based on a database having a data source associated with the electronic device to determine the set of choices in response to the communication, the data source including information pertaining to the user of the electronic device.

5. The computer-implemented method of claim 1, wherein the analyzing the communication is based on an external data source associated with the user of the electronic device for inferring patterns of activity, behavior, or intent from the user of the electronic device.

6. The computer-implemented method of claim 1, wherein the analyzing the communication is based on a data store of historical user data for groups of users.

7. The computer-implemented method of claim 1, wherein the at least one question includes multiple dichotomous or multiple choice questions, wherein each dichotomous or multiple choice question narrows down a decision made by the user of the electronic device for performing the associated task.

8. A computer program product residing on a computer readable storage medium having a plurality of instructions stored thereon which, when executed across one or more processors, causes at least a portion of the one or more processors to perform operations comprising:
receiving a communication from an electronic device;
analyzing the communication to determine a set of choices in response to the communication, where at least one choice from the set of choices has an associated task predicted for a user of the electronic device;
creating a query from the set of choices, the query including at least one question arranged in a structure to select among the set of choices, the structure corresponding to the at least one choice and the associated task;
sending the query to the electronic device for presentation to the user of the electronic device;
receiving, from the electronic device, an input in response to the at least one question; based on the input, traversing the structure to reduce the set of choices to a selected choice;
based on the selected choice, where the selected choice is the at least one choice having the associated task, determining one or more actions to accomplish the associated task; and
performing the one or more actions to improve prediction and implementation of the at least one choice from the set of choices.

9. The computer program product of claim 8, wherein the structure includes a root and one or more leaves, wherein the root and the one or more leaves are on a same level of the structure.

10. The computer program product of claim 8, wherein the structure includes a root and one or more leaves, wherein the root is on a first level of the structure and the one or more leaves are on one or more second levels of the structure that are different than the first level.

11. The computer program product of claim 8, wherein the analyzing the communication is based on a database having a data source associated with the electronic device to determine the set of choices in response to the communication, the data source including information pertaining to the user of the electronic device.

12. The computer program product of claim 8, wherein the analyzing the communication is based on an external data source associated with the user of the electronic device for inferring patterns of activity, behavior, or intent from the user of the electronic device.

13. The computer program product of claim 8, wherein the analyzing the communication is based on a data store of historical user data for groups of users.

14. The computer program product of claim 8, wherein the at least one question includes multiple dichotomous or multiple choice questions, wherein each dichotomous or multiple choice question narrows down a decision made by the user of the electronic device for performing the associated task.

15. A computing system including one or more processors and one or more memories configured to perform operations comprising:
receiving a communication from an electronic device;
analyzing the communication to determine a set of choices in response to the communication, where at least one choice from the set of choices has an associated task predicted for a user of the electronic device;
creating a query from the set of choices, the query including at least one question arranged in a structure to select among the set of choices, the structure corresponding to the at least one choice and the associated task;

sending the query to the electronic device for presentation to the user of the electronic device;

receiving, from the electronic device, an input in response to the at least one question; based on the input, traversing the structure to reduce the set of choices to a selected choice;

based on the selected choice, where the selected choice is the at least one choice having the associated task, determining one or more actions to accomplish the associated task; and performing the one or more actions to improve prediction and implementation of the at least one choice from the set of choices.

16. The computing system of claim 15, wherein the structure includes a root and one or more leaves, wherein the root and the one or more leaves are on a same level of the structure.

17. The computing system of claim 15, wherein the structure includes a root and one or more leaves, wherein the root is on a first level of the structure and the one or more leaves are on one or more second levels of the structure that are different than the first level.

18. The computing system of claim 15, wherein the analyzing the communication is based on a database having a data source associated with the electronic device to determine the set of choices in response to the communication, the data source including information pertaining to the user of the electronic device.

19. The computing system of claim 15, wherein the analyzing the communication is based on an external data source associated with the user of the electronic device for inferring patterns of activity, behavior, or intent from the user of the electronic device.

20. The computing system of claim 15, wherein the analyzing the communication is based on a data store of historical user data for groups of users.

* * * * *